H. L. GEVEKE.
TRENCHING MACHINE.
APPLICATION FILED JAN. 31, 1918.

1,301,833. Patented Apr. 29, 1919.

Inventor:
Hendrik Lodewijk Geveke

UNITED STATES PATENT OFFICE.

HENDRIK LODEWIJK GEVEKE, OF HILVERSUM, NETHERLANDS, ASSIGNOR TO NAAM-LOOZE VENNOOTSCHAP GEVEKE & CO'S TECHNISCH BUREAU, OF AMSTERDAM, NETHERLANDS, A COMPANY OF NETHERLANDS.

TRENCHING MACHINE.

1,301,833.  Specification of Letters Patent.  Patented Apr. 29, 1919.

Application filed January 31, 1918. Serial No. 214,644.

*To all whom it may concern:*

Be it known that I, HENDRIK LODEWIJK GEVEKE, residing at Hilversum, the Netherlands, have invented certain new and useful Improvements in Trenching Machines, of which the following is a specification.

The invention relates to an apparatus or machine for cutting trenches or furrows for the purpose of putting plants, especially sugar cane, in the ground in accordance with the so-called "Reynoso" system. In accordance with said system, as is generally known in the art, parallel trenches or furrows having a width of about 50 centimeters and a depth of about 35 centimeters are made in the previously plowed ground. These trenches are spaced apart about 75 centimeters. The excavated soil is thrown up into dams alongside the trenches, and is gradually spread over the roots of the plants as the latter grow up. In the olden days such trenches were dug by hand throughout; in recent years, however, many efforts have been exercised to provide a suitable machine for the said purpose and the scarcity of agricultural laborers, who could earn higher wages in other branches, gave a strong stimulus to making such endeavors.

The so-called "Reynoso" plows have for their purpose to cut furrows or trenches in the previously plowed ground and to throw the elevated soil up into dams alongside the furrows. With these machines the detached soil is thrown up in the form of big clods, so that it is not in the most favorable condition from an agricultural point of view, unless the clods are reduced by hand, which, however, involves a great loss of time and money. Moreover, such plows require much power, as the plow-share encounters the resistance offered by a layer of earth having the height and the width of the trench to be made.

The machine according to the present invention is provided with a cutting tool having a section corresponding to that of the trench to be made, and inclosing a screw-shaped boring tool, adapted to rotate about its axis. This trenching device proper, after being lowered the required depth, is moved through the ground.

The employment of screw-shaped boring tools for elevating earth or mud is not broadly new.

The machine according to the present invention has the following characteristic features:—

A cutting tool, having in section the shape of the trench to be cut, partly incloses a screw-shaped boring tool which is rotatable about its axis; said boring tool is mounted at the rear of a carriage or the like in an inclined position with its free end pointing forward;

The free end of the screw-shaped boring tool extends beyond the cutting tool by which it is inclosed;

The bottom edge of the cutting tool inclosing the boring tool is recessed;

The side walls of the cutting tool inclosing the boring tool are provided with discharge openings, behind which tunnel-shaped members are provided.

The arrangement described above has the following advantageous features:—

By the coaction of a cutting tool having a sectional shape corresponding to that of the trench to be cut with a boring tool revolving in same, a trench of any desired section can be made in one single operation with a comparatively low power consumption;

Owing to the arrangement of the boring tool in an inclined position at the rear of the carriage with its free end pointing forward the free end of the screw will loosen and disintegrate the soil before the latter is engaged and elevated by the higher screw threads; the soil, therefore, is elevated in the most favorable condition from an agricultural point of view, and the provision of the boring tool at the rear of the carriage allows the soil to be delivered directly alongside the trench as the dam thus formed does not interfere with the travel of the machine;

Owing to the free end of the boring tool projecting below the bottom edge of the cutting tool by which it is inclosed, the soil is loosened a certain distance below the bottom level of the trench made; this loose condition favorably affects the growth of the young plants;

As the bottom edge of the cutting tool is recessed, the bottom of the trench will be curved, so that the rainwater is allowed to flow along the slopes of the curved bottom, which prevents the roots of the plants from being damaged by excess of moisture;

The excavated soil is discharged to the right or to the left through the openings provided in the side walls of the cutting tool; the tunnel-shaped members provided behind these openings mold the elevated soil into continuous dams; the earth, being brought in a finely divided condition by the boring tool, is utilized for being gradually spread around the foot of the plants put in the ground.

Figure 1:
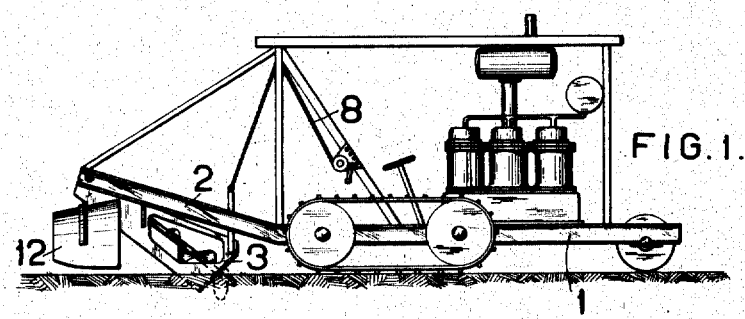
Figure 1 is a side elevation of the trenching machine.
Figure 2:
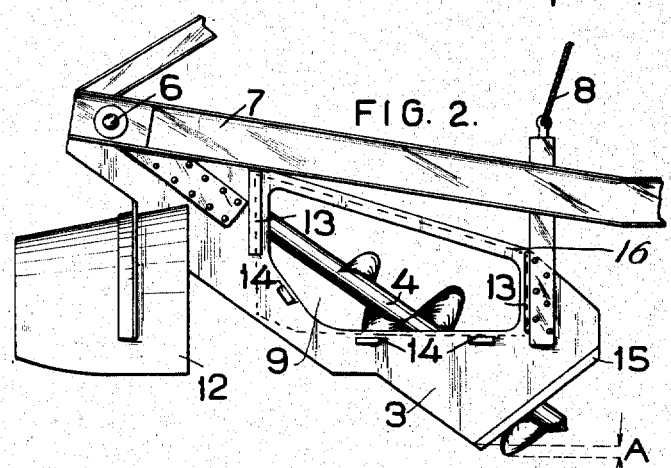
Fig. 2 is a side elevation of the trenching device proper on an enlarged scale.
Figure 3:
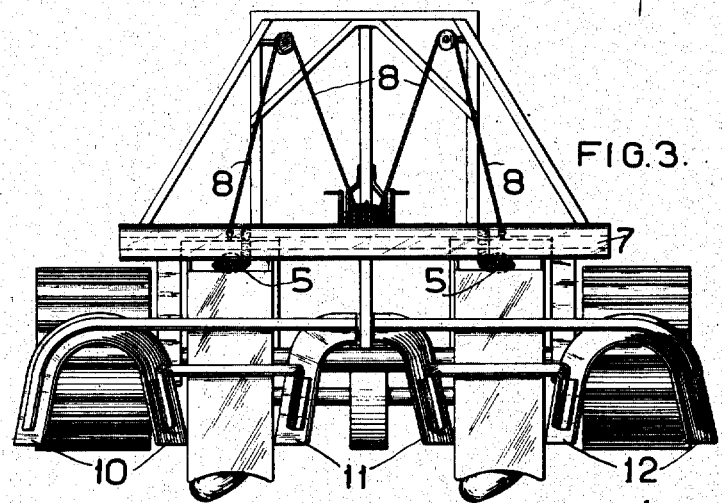
Fig. 3 is an end view of the trenching machine on an enlarged scale.

At the rear end of a motor driven carriage 1 two trenching devices 2 are mounted in an inclined position with their free ends pointing forward. In the example given the carriage is a so-called tractor, (caterpillar), which has special advantages for the present purpose.

Each of the trenching devices 2 comprises a cutting tool 3 having the shape of a rectangular tube. Said tube determines the sectional shape of the trench to be made; instead of rectangular same may be trapeziform in section or have any other suitable shape.

The cutting tool 3 incloses the screw-shaped boring tool 4 whose shaft carries a bevel gear 5 at its top. A bevel gear meshing with the gear 5 is driven through a suitable transmission gear by the motor of the tractor, so that rotary movement may be imparted to the boring tool 4. The top of the trenching device 2 is rotatably mounted on a shaft 6 carried in a frame 7. The bottom end of said device is suspended by means of chains or cables 8 from guide pulleys attached near the top of the frame. When traveling on roads the trenching device is hoisted so that its bottom edge is at some distance above the road level. If the machine is to be put in operation the trenching device is lowered with its free end the required depth below the ground level.

The screw-shaped boring tool 4 projects some distance below the bottom edge of the cutting tool 3. This arrangement allows the soil below the bottom level of the trench to be loosened through a distance A. The soil between the bottom edge of the cutting tool 3 and the ground level is finely reduced by the screw threads of the boring tool 4 and elevated in the tube-shaped top part of the cutting tool.

Openings 9 in the side walls of the cutting tool serve for discharging the elevated soil alongside the trench made, tunnel-shaped members 10, 11 and 12 secured behind the openings 9 having for their object to mold the soil discharged alongside the trenches into continuous dams.

Assuming now that the trenching machine is to be put in operation on a sugar cane field and that it commences to work in a corner of the field.

As the boring tools looking from the rear side of the machine have an anti-clockwise rotary movement, the tunnels 10 and 11 will mold the soil into continuous dams at the left hand side of the trenches. When the machine has reached the end of the field it is turned in order that it may travel in the opposite direction. In order that the soil during this reverse travel of the machine may be discharged at the same side of the trenches, the left hand side openings in the walls of the cutting tools 3, in front of the tunnels 10 and 11, are shut off by means of slides (not shown) guided in grooves 13 and supported in their closed position on projections 14. Owing to the fact that the direction of rotation of the boring tools remains unchanged, the elevated soil is again thrown up against the left hand side walls of the cutting tools 3, but as the discharge openings in these walls are closed, it will be discharged through the openings in the right hand side walls and formed into continuous dams by the tunnel-shaped molding-members 11 and 12. The boring tools need not necessarily be operated simultaneously; in some cases the trenching devices may be driven alternately, so that the right hand side device is in operation during the travel of the machine in one direction, the left hand side device during the travel in the reverse direction.

The bottom edge of the cutting tool 3 is provided with a strengthening strip 15 in order that it may stand the heavy strain to which it is exposed.

The bottom edge of the rear wall of the cutting tool 3 is recessed in order that the bottom of the trench may receive a curved form for the purpose stated.

It is obvious that the above embodiment of the invention may be varied in many respects without departing from the scope and the spirit of the invention.

What I claim as my invention and desire to secure by Letters Patent is:

1. In a trenching machine, the combination of a cutting-tool having in section the shape of the trench to be made with a screw-shaped boring-tool which is rotatable about its axis and substantially inclosed by the said cutting-tool.

2. In a trenching machine, the combination of a carriage, with a trenching device comprising in combination a cutting-tool having in section the shape of the trench to be made and a screw-shaped boring-tool which is rotatable about its axis and substantially inclosed by the said cutting-tool, the said trenching device being secured at the rear end of the carriage in an inclined position with its free end pointing forward.

3. In a trenching machine, the combination of a carriage, a cutting-tool having in section the shape of the trench to be made, and a screw-shaped boring-tool which is rotatable about its axis and substantially inclosed by the said cutting-tool so as to project below the bottom edge of said cutting-tool.

4. In a trenching-machine, the combination of a carriage, a cutting-tool having in section the shape of the trench to be made, and having the bottom-edge of its rear wall recessed, and a screw shaped boring-tool which is rotatable about its axis and substantially inclosed by the said cutting-tool.

5. In a trenching-machine, the combination of a carriage, with a trenching-device comprising a cutting-tool having in section the shape of the trench to be made and a screw-shaped boring-tool which is rotatable about its axis and substantially inclosed by the said cutting-tool, the said trenching-device being pivotally connected with the rear end of the carriage in an inclined position with its free end pointing forward.

6. In a trenching-machine, the combination of a carriage, a cutting-tool having in section the shape of the trench to be made, and a screw-shaped boring-tool which is rotatable about its axis and substantially inclosed by the said cutting-tool, a side wall of the cutting-tool having an opening through which the soil elevated may be discharged.

7. In a trenching-machine, the combination of a carriage, a cutting-tool having in section the shape of the trench to be made, and a screw-shaped boring-tool which is rotatable about its axis and substantially inclosed by the said cutting-tool, a side-wall of the cutting-tool having an opening through which the soil elevated may be discharged and adapted to be closed by a slide.

8. In a trenching-machine, the combination of a carriage, a cutting-tool having in section the shape of the trench to be made, and a screw-shaped boring-tool which is rotatable about its axis and substantially inclosed by the said cutting tool, both side-walls of the cutting-tool having an opening through which the soil elevated may be discharged and adapted to be closed by slides.

9. In a trenching-machine, the combination of a carriage, a cutting-tool having in section the shape of the trench to be made and having a side wall provided with an opening for discharging the soil elevated, a screw-shaped boring-tool which is rotatable about its axis and substantially inclosed by the said cutting-tool with a tunnel-shaped member secured to the carriage behind the said opening and adapted to mold the discharged soil into a continuous dam.

In testimony whereof I have affixed my signature in presence of two witnesses.

HENDRIK LODEWIJK GEVEKE.

Witnesses:
W. HENDRICKS,
D. H. DE BAER.

Copies of this patent may be obtained for five cents each, by addressing the "Commissioner of Patents, Washington, D. C."